Patented Apr. 26, 1949

2,468,670

UNITED STATES PATENT OFFICE 2,468,670

MANUFACTURE OF THYMOL

Walter Edward Huggett and George Frank Duffin, Gidea Park, England, assignors to Howards & Sons Limited, Ilford, England No Drawing. Application January 23, 1945, Serial No. 574,215. In Great Britain January 25, 1944

4 Claims. (Cl. 260—626)

It is known to prepare thymol by propylating sulphonated meta-cresol, and subsequently splitting off the sulphonic acid groups by desulphonation. In the known processes of this kind the thymol is produced in admixture with considerable quantities of isomers thereof, and tarry products are formed. The isolation of thymol from its isomers in satisfactory quantities is difficult owing to the high proportion of the isomers in relation to thymol.

We have now found that by propylating a mixture of meta-cresol mono- and di-sulphonic acids obtained by sulphonating meta-cresol and in which the proportion of the 6-monosulphonic acid is considerably larger than that of the 4-monosulphonic acid so as to mono-propylate only the monosulphonic acids, there is obtained a higher yield of thymol calculated on the meta-cresol consumed, and a higher proportion of thymol relatively to its isomers, than in the known processes. Thus, a mixture of thymol and its isomers is obtainable from which thymol can be isolated in satisfactory quantities by crystallisation. Moreover, the formation of tarry products is considerably reduced.

According to the present invention, therefore, a process for the manufacture of thymol comprises, sulphonating meta-cresol to produce a mixture of meta-cresol mono- and disulphonic acids in which at least 70 per cent of the monosulphonic acids consists of meta-cresol-6-sulphonic acid, treating the sulphonation mixture with a quantity of propylene or of a substance yielding propylene, for example, isopropyl alcohol or normal propyl alcohol, sufficient to mono-propylate substantially only the monosulphonic acids, desulphonating the sulphonic acids in the resulting reaction mixture to produce meta-cresol and a mixture of propylated meta-cresols, separating the meta-cresol, and isolating thymol from the mixture of propylated meta-cresols.

As is well known in propylating reactions, propylene or substances yielding propylene under the conditions of reaction lead to the formation of iso-propyl-derivatives, together with small quantities of normal propyl-derivatives, and accordingly the terms "propylated" and "propyl" are used herein to include isopropyl derivatives, together with such small quantities of normal propyl-derivatives as are obtained by means of the aforesaid propylating agents.

The meta-cresol recovered from the process can, of course, be used in a further treatment. We have found, however, that it is of advantage also to return to the process the recovered mixture of propylated meta-cresols, which may still contain some thymol. The mixture thus returned takes the place of a part of the meta-cresol and of the propylating agent required for the further treatment. Thus, the quantity of meta-cresol as such and of the propylating agent can each be reduced by an amount equivalent to the quantity of the meta-cresol residue and of propyl radical present in the recovered mixture of propylated meta-cresols, and the composition of the mixture of meta-cresol, thymol and thymol isomers obtained will be approximately the same as that of the mixture obtained when meta-cresol alone is used. When isopropyl alcohol is used as the propylating agent, it is necessary to take into account the quantity of water required by the meta-cresol residue and the propyl radical to form meta-cresol and propyl alcohol, respectively. This quantity of water must either be already present in the mixture or added thereto together with the propylated meta-cresols.

In order to produce a mixture of meta-cresol mono- and di-sulphonic acids in which at least 70 per cent of the mono-sulphonic acids consists of meta-cresol-6-sulphonic acid, moderately strong conditions of sulphonation are required. For example, the sulphonation may be conducted with concentrated sulphuric acid of 98 per cent strength, advantageously in a proportion of 3 mols of $H_2SO_4$ per mol of meta-cresol at a temperature of at least 80° C., and preferably 100-120° C. The higher the temperature the greater is the proportion of meta-cresol-6-sulphonic acid obtained relatively to the 4-sulphonic acid, but it is generally not desirable to exceed a temperature of 130° C. since the quantities of meta-cresol-4:6-disulphonic acid and by-products, such as sulphones, also formed become unduly large. By sulphonating with 3 mols of sulphuric acid of 98 per cent strength at a temperature of 120° C., there can be obtained a sulphonation mixture containing, apart from unchanged sulphuric acid and water, approximately 1 per cent of unchanged meta-cresol, 7 per cent of meta-cresol-4-sulphonic acid, 46 per cent of meta-cresol-6-sulphonic acid, 39 per cent of meta-cresol-4:6-disulphonic acid and 7 per cent of sulphones and other by-products. If desired, other sulphonating agents may be used, for example, chlorosulphonic acid at a temperature of about 20-40° C. or fuming sulphuric acid at a suitably low temperature and short period of reaction. By conducting the sulphonation with chlorosulphonic acid at 20° C. a sulphonation mixture can be obtained containing 8.9 per cent of unchanged meta-cresol, 21.5 per cent of meta-cresol-4-sulphonic acid, 56.9 per cent of meta-cresol-6-sulphonic acid, 6.2 per cent of meta-cresol-4:6-disulphonic acid and 6.5 per cent of sulphones and other by-products.

The mono-propylation of the meta-cresol monosulphonic acids may be conducted by known methods, but with a proportion of the propylating agent, for example, isopropyl alcohol, sufficient to react substantially only with the monosulphonic acids. The propylation with isopropyl alcohol may be conducted at a temperature ranging from 40–140° C., preferably 100 to 120° C., for a period which varies according to the temperature used.

Since the propylating reaction is considerably slower than the sulphonation under the same conditions of temperature, it is not essential to complete the sulphonation before introducing the propylating agent into the mixture. Thus, for example, after adding the concentrated sulphuric acid without permitting the temperature of the mixture to rise above, say, 50–55° C., the isopropyl alcohol may be added while maintaining the mixture at the same temperature, and the mixture may then be heated, for example, at 100–120° C., until the desired sulphonation and subsequent propylation are complete. This procedure, as compared with the alternative method of completing the sulphonation before adding the isopropyl alcohol, has the advantage of saving time and avoids the need for cooling the mixture after sulphonation below the boiling point of isopropyl alcohol before the latter is added.

The sulphonic acids present in the mixture after the sulphonation and propylation, that is to say the propylated monosulphonic acids and the substantially unchanged disulphonic acid, are then desulphonated, for example, by heating the mixture with water, and the mixture of phenolic bodies thus formed is separated, for example, by steam distillation. If desired, steam distillation may be used to perform both the desulphonation and the separation of the phenolic bodies. The resulting mixture of phenolic bodies consists substantially wholly of meta-cresol, thymol and isomers of thymol. A high proportion of thymol relatively to the isomers thereof is present. Thus, for example, from a sulphonation mixture of the composition first given above there can be obtained a mixture of phenolic bodies consisting approximately of 40 per cent of meta-cresol and 60 per cent of a mixture of thymol and its isomers, which latter mixture contains about 75–80 per cent of thymol.

The meta-cresol may be separated from the mixture of phenolic bodies by distillation, or by a chemical method of separation which takes advantage of the more acid character of the meta-cresol. Owing to the high proportion of thymol present in the mixture remaining after the separation of the meta-cresol the greater part of the thymol can be isolated in crystalline form by cooling the mixture. In this manner it is possible to isolate approximately 85 per cent of the thymol present in a mixture containing about 75–80 per cent of thymol. Although crystallisation is an especially advantageous method of separation, it is to be understood that other methods which take advantage of the high proportion of thymol present are not excluded.

The meta-cresol and residual mixture of propylated meta-cresols containing some thymol are re-used in a further treatment with the addition of a quantity of fresh meta-cresol which is sufficient, together with the meta-cresol recovered and the meta-cresol in propylated form, to make up the total quantity of meta-cresol required for the further treatment. If necessary, an appropriate quantity of water is also added for the purpose explained above. The sulphonation is then conducted in the manner described above to sulphonate the free and propylated meta-cresol present, and for mono-propylating the mono-sulphonic acids the quantity of isopropylating agent added is reduced by an amount equivalent to the quantity of propyl radical contained in the propylated meta-cresol present. The composition of the mixture of meta-cresol, thymol and other propylated meta-cresols thus obtained is approximately the same as that of the mixture obtained when metacresol alone is used.

The following examples illustrate the invention, the parts being by weight:

*Example 1*

1200 parts of concentrated sulphuric acid of 98 per cent strength are slowly added so as to maintain a temperature of 50–55° C., while stirring, to 432 parts of meta-cresol. The mixture is then heated at 120° C. until the sulphonation is complete. The sulphonation mixture is cooled to 80° C., and 120 parts of absolute isopropyl alcohol are slowly added so that the temperature of the mixture is about 70° C. when all the isopropyl alcohol has been added. The mixture is then heated at 120° C. until the propylation is complete. The reaction mixture is cooled somewhat and poured into 1200 parts of water. The whole is then steam distilled at 140° C. to desulphonate the sulphonic acids present and to yield 480 parts of an oily distillate consisting of meta-cresol, thymol and other propylated meta-cresols. 26 parts of a residual tarry material, which is not volatile in steam, remain in the distillation vessel.

The oily distillate is dried, and then distilled first to recover 220 parts of substantially pure meta-cresol and then 249 parts of a mixture of mono-propylated meta-cresols boiling at 229–245° C. and containing 195 parts of thymol. By cooling the latter mixture to 15° C. 125 parts of thymol are deposited in crystalline form. After separating the latter, a further 35 parts of thymol crystals are deposited by cooling the oily mixture to −20° C.

*Example 2*

1500 parts of concentrated sulphuric acid of 98 per cent strength are slowly added so as to maintain a temperature of 50–55° C., while stirring, to 540 parts of meta-cresol, and then 150 parts of absolute isopropyl alcohol are slowly added while maintaining the mixture at the same temperature. The whole is then heated at 120° C. until the desired sulphonation and subsequent propylation are complete. The reaction mixture is then poured into 2000 parts of water, and the whole is steam distilled at 140° C. until no more oily distillate can be collected. The oily distillate is dried, and worked up in the manner described in Example 1. There are obtained 264 parts of meta-cresol and 290 parts of a mixture of mono-propylated meta-cresols containing 223 parts of thymol, of which 178 parts are isolated by the crystallising operations. The yield of thymol isolated is therefore 65 per cent calculated on the meta-cresol consumed. 28 parts of residual tarry material remain behind after the steam distillation of the reaction mixture.

In order to compare the effect of using a quantity of propyl alcohol intended to isopropylate the whole of the sulphonated meta-cresol, as is customary in the known processes, the sulphonation and propylation as described in Example 2 were repeated with the addition of 300 parts of absolute isopropyl alcohol, instead of 150 parts. The oily distillate obtained by the steam distillation was dried, and worked up in the same manner. There were obtained 74 parts of unchanged meta-cresol, 58 parts of di-propyl-meta-cresols in the distillation residue, and 362 parts of a mixture of mono-propylated meta-cresols containing 182 parts of thymol, of which only 62 parts were isolated by the crystallising operations. The yield of thymol isolated was, therefore, 13 per cent calculated on the meta-cresol consumed, and only one quarter of that obtained by the process of Example 2. Moreover, 146 parts of residual tarry material remained behind after the steam distillation of the reaction mixture.

*Example 3*

This example illustrates the re-use of the meta-cresol and propylated meta-cresols recovered from a previous treatment.

1500 parts of concentrated sulphuric acid of 98 per cent strength are slowly added so as to maintain a temperature of about 50° C., while stirring, to 476 parts of meta-cresol, of which 264 parts had been recovered from the previous treatment. 115 parts of absolute isopropyl alcohol, 11 parts of water, and 89 parts of propylated meta-cresols recovered from the previous treatment, are then added while maintaining the mixture at the same temperature. The propylated meta-cresols and the added water thus make good the deficiency of meta-cresol (64 parts) and of isopropyl alcohol (35 parts). The whole is then heated at 120° C., until the sulphonation and subsequent propylation are complete. The reaction mixture is then further treated and worked up in the manner described in Example 2. There are obtained 265 parts of meta-cresol, 16 parts of dipropyl-meta-cresols, and 260 parts of a mixture of mono-propylated meta-cresols, from which latter mixture 174 parts of thymol are isolated, representing a yield of 65 per cent calculated on the meta-cresol consumed. 28 parts of a residual tarry material remain behind after the steam distillation of the reaction mixture.

We claim:

1. A process for the manufacture of thymol which comprises, sulphonating meta-cresol with concentrated sulphuric acid of 98 per cent strength in a proportion of substantially 3 mols of $H_2SO_4$ per mol of meta-cresol at a temperature of at least 80° C. but not exceeding 180° C. to produce a mixture of meta-cresol mono- and di-sulphonic acids in which at least 70 per cent of the mono-sulphonic acids consists of meta-cresol-6-sulphonic acid, treating the sulphonation mixture with a quantity of propylating agent selected from the group consisting of isopropyl alcohol, normal propyl alcohol and propylene which amounts to substantially one molecular proportion for every molecular proportion of mono-sulphonated meta-cresol present in the sulphonation mixture, desulphonating the sulphonic acids present in the resulting reaction mixture to produce meta-cresol and a mixture of propylated meta-cresols, separating the meta-cresol, and isolating thymol from the mixture of propylated meta-cresols.

2. A process as claimed in claim 1, wherein the propylating agent is introduced into the sulphonation mixture before the sulphonation is complete, and the resulting mixture is then heated to bring about the desired sulphonation and subsequent propylation.

3. A process as claimed in claim 1, wherein the mixture of propylated meta-cresols is cooled to isolate thymol by crystallization.

4. A process as claimed in claim 1, wherein there is utilized as a part of the meta-cresol to be treated and as a part of the propylating agent a mixture of propylated meta-cresols which has been recovered after isolating thymol therefrom in a previous process for making thymol comprising the aforesaid steps.

WALTER EDWARD HUGGETT.
GEORGE FRANK DUFFIN.

REFERENCES CITED

The following references are of record in the file of this patent:

UNITED STATES PATENTS

| Number | Name | Date |
|---|---|---|
| 1,412,937 | Gunther | Apr. 18, 1922 |
| 1,876,435 | Schollkopf et al. | Sept. 6, 1932 |

FOREIGN PATENTS

| Number | Country | Date |
|---|---|---|
| 197,848 | Great Britain | May 24, 1923 |
| 379,952 | Germany | Aug. 31, 1923 |